United States Patent
Rankl

(10) Patent No.: US 7,181,602 B1
(45) Date of Patent: Feb. 20, 2007

(54) METHOD FOR EXCHANGING AT LEAST ONE SECRET INITIAL VALUE BETWEEN A PROCESSING STATION AND A CHIP CARD

(75) Inventor: Wolfgang Rankl, Frauenau (DE)

(73) Assignee: Giesecke & Devrient GmbH, Munich (DE)

( * ) Notice: Subject to any disclaimer, the term of this patent is extended or adjusted under 35 U.S.C. 154(b) by 0 days.

(21) Appl. No.: 09/492,273

(22) Filed: Jan. 27, 2000

(30) Foreign Application Priority Data

Jan. 25, 1999 (DE) ................................ 199 02 722

(51) Int. Cl.
- *G06F 9/00* (2006.01)
- *G06F 7/04* (2006.01)
- *H04L 9/00* (2006.01)
- *G06Q 40/00* (2006.01)
- *G06F 7/58* (2006.01)
- *G06F 12/00* (2006.01)

(52) U.S. Cl. ............................ 713/1; 713/174; 380/44; 726/20; 705/41; 257/922; 902/26

(58) Field of Classification Search ................ 713/176, 713/175, 171, 172, 180, 184–186, 1, 174; 380/30, 44, 285, 278; 705/67, 41, 65, 44; 726/20; 257/922; 902/26

See application file for complete search history.

(56) References Cited

U.S. PATENT DOCUMENTS

| | | | | |
|---|---|---|---|---|
| 4,200,770 A * | 4/1980 | Hellman et al. | ............... | 380/30 |
| 4,965,827 A * | 10/1990 | McDonald | .................... | 705/65 |
| 4,995,082 A * | 2/1991 | Schnorr | ....................... | 713/169 |
| 5,140,634 A * | 8/1992 | Guillou et al. | ............... | 713/180 |
| 5,224,163 A * | 6/1993 | Gasser et al. | ................ | 380/30 |
| 5,452,358 A * | 9/1995 | Normile et al. | ................ | 380/42 |
| 5,590,199 A * | 12/1996 | Krajewski et al. | .......... | 713/159 |
| 5,602,915 A | 2/1997 | Campana et al. | .............. | 380/21 |
| 5,602,918 A * | 2/1997 | Chen et al. | .................. | 713/153 |
| 5,724,425 A * | 3/1998 | Chang et al. | .................. | 705/52 |
| 5,742,756 A * | 4/1998 | Dillaway et al. | ........... | 713/200 |
| 6,038,551 A * | 3/2000 | Barlow et al. | ................ | 705/41 |
| 6,179,205 B1 * | 1/2001 | Sloan | ......................... | 235/382 |

FOREIGN PATENT DOCUMENTS

DE      4138861 A1    11/1991

(Continued)

OTHER PUBLICATIONS

Königs, Hans-Peter. "Cryptographic Identification Methods for Smart Cards in the Process of Standardization" Jun. 1999, IEEE Communications Magazine, pp. 42-48.*

(Continued)

*Primary Examiner*—Gilberto Barron
*Assistant Examiner*—Michael J. Simitoski
(74) *Attorney, Agent, or Firm*—Bacon & Thomas, PLLC

(57) ABSTRACT

The invention relates to a method for exchanging at least one secret initial value between a processing station and a chip card, in an initializing step for the chip card.

In the initialization of chip cards in known methods an initial value, e.g. a key, is transmitted from a processing station to the chip card and stored therein. Since this key is transmitted in plaintext this involves security problems.

In the present invention the described security problems are solved by only parts of the key being exchanged between processing station and chip card and the key being generated in the chip card and the processing station from the parts.

9 Claims, 1 Drawing Sheet

$$IS \begin{cases} X\ g\ n \longleftarrow X\ g\ n \longleftarrow X = g^x \bmod n \\ Y = g^y \bmod n \longrightarrow Y \longrightarrow Y \\ K = X^y \bmod n & K = Y^x \bmod n \end{cases}$$

$$PS \begin{cases} & PD = dec(KM;\ PD_{KM}) \longleftarrow PD_{KM} \\ PD = dec(K;\ PD_K) \longleftarrow PD_K \longleftarrow PD_K = enc(K;\ PD) \end{cases}$$

FOREIGN PATENT DOCUMENTS

| | | |
|---|---|---|
| DE | 0500245 A2 | 8/1992 |
| DE | 2811872 C1 | 1/1993 |
| DE | 4342641 A1 | 6/1995 |
| DE | 19523009 A1 | 6/1995 |
| EP | 0281057 A2 | 9/1988 |
| EP | 0281059 A2 | 9/1988 |
| FR | 2759833 A1 | 8/1998 |

OTHER PUBLICATIONS van Oorschol, Paul C. "Extending Cryptographic Logics of Belief to Key Agreement Protocols (Extended Abstracts)" 1993, 1st Conf.-Computer & Comm. Security.*

Schneier, Bruce. Applied Cryptography, Second Ed. John Wiley & Sons, Inc. 1996, pp. 513-514.*

Menezes et al. Handbook of Applied Crytography, CRC Press, 1997, §10.3.*

Candle Computer Report (CCR). "Securing Messaging Middleware Applications—Part 2", Jan. 1999.*

DataKey Inc. "SignaSURE Model 320 and 370", 1998.*

Schneier, Bruce. Applied Cryptography, Second Edition, 1996 John Wiley & Sons, pp. 173, 174, 176, 177, 513 & 514.*

Everett, David B. "Smart Card Tutorial—Integrated Circuit Standards and Specifications—Part 1", Sep. 1996.*

Everett, David B. "Smart Card Tutorial—Integrated Circuit Card Standards and Specifications—Part 10", Jul. 1997.*

Search Report Issued by German Patent Office.

European Search Report.

IBM Technical Disclosure Bulletin, vol. 26, (XP-002137529) dated Dec. 1983.

* cited by examiner

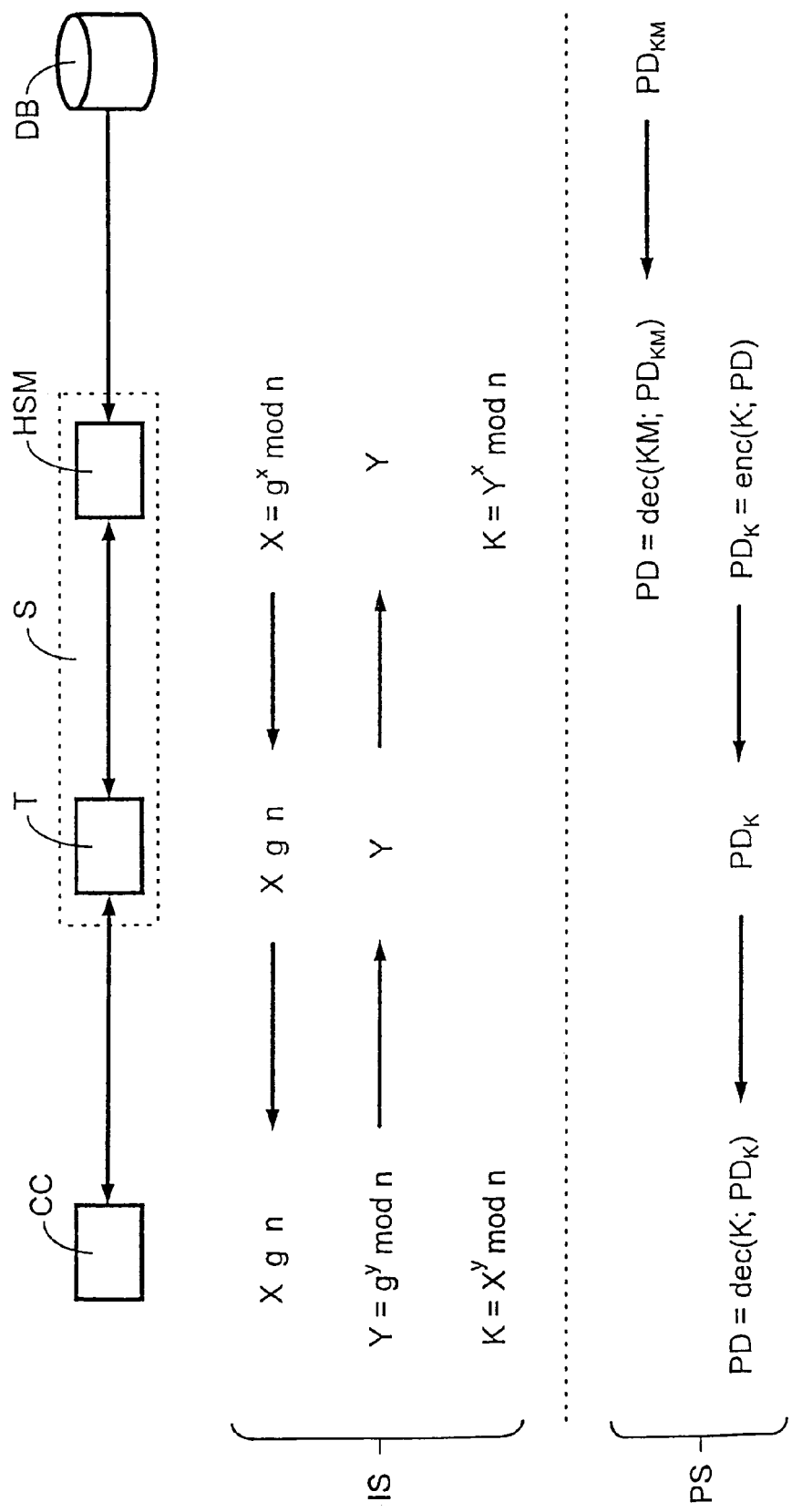

METHOD FOR EXCHANGING AT LEAST ONE SECRET INITIAL VALUE BETWEEN A PROCESSING STATION AND A CHIP CARD

BACKGROUND OF THE INVENTION

1. Field of the Invention

This invention relates to a method for exchanging at least one secret initial value between a processing station and a chip card, in an initializing step for the chip card.

2. Description of Related Art

Such methods have been known for some time and are used in producing chip cards, which are employed today in many areas, e.g. in access control systems or as means of payment, for the purpose of safe operation of the chip cards. The chip card usually comprises an integrated circuit and coupling elements electrically connected with the integrated circuit and used for communication with external devices, for example a processing station. The coupling elements are designed either in the form of contact surfaces for touch contacting or as coils for non-touch contacting.

In conventional methods the last step performed in producing the chip card is initialization and personalization of the chip card. This provides the software pre-conditions for loading all data required for later operation of the card into the memory of the integrated circuit. During initialization all globally necessary data are transmitted for this purpose and the necessary file structures set up. During personalization the individual data are transmitted from the processing station to the chip card and stored in corresponding memory spaces. The data needed for personalization can be for example the name, address and a secret key.

To ensure that the personalizing data, in particular for example a secret key, cannot be intercepted during personalization to avoid later misuse, initialization and personalization are in the known method usually performed in separate process steps and sometimes also in separate rooms with different personnel. During initialization a serial number stored on the chip card is for example transmitted for this purpose to the processing station. For transmission the processing station has a terminal. Furthermore the processing station usually has a security module to which the terminal passes on the number of the chip card. In the security module a key is generated with the number of the chip card, the key being transmitted to the chip card by means of the terminal.

In the following personalizing step, data from a data base containing the data necessary for personalization are transmitted to the chip card and stored in the corresponding memory spaces of the chip card. The personalizing data of the personalizing data base are usually present in encrypted form. In order to avoid misuse, the key for decrypting the personalizing data is normally not known to the manufacturer of the chip card. This key is known only to the institute making the personalizing data available, for example a bank issuing the chip card to be used as a means of payment. For further processing of the encrypted personalizing data, they are loaded into the security module of the processing station. The security module offers a separate unit which is specially protected against attempts at manipulation. The security module contains the key needed for decrypting the personalizing data. With this key the personalizing data are decrypted in the security module and then encrypted again with the key generated during initialization, which was previously loaded into the chip card from the security module. The thus encrypted data are transmitted to the chip card from the security module via the terminal. Subsequently the encrypted data are decrypted with the known key in the chip card and stored in the corresponding memory spaces of the integrated circuit of the chip card.

The known method thus has the disadvantage that at least at one time, namely during initialization of the chip card, a secret key needed for data transmission between a processing station and a chip card must be transmitted once in plaintext. If this key is intercepted, all data and secret keys transmitted in the later personalizing step can be decrypted. If the key is individual to a card, at least the security of this one card would be broken.

SUMMARY OF THE INVENTION

The problem of the present invention is therefore to state a method for exchanging at least one secret initial value between a processing station and a chip card, during initialization of the chip card, which has greater security and can be used more simply compared to the prior art.

This problem is solved by the features of claim 1.

The invention starts out from the idea of not transmitting sensitive data between the processing station and the chip card in plaintext at any time. This is obtained by generating values both in the processing station and in the chip card which are transmitted to the chip card or processing station only in part. The secret data are then determined from the generated and the transmitted values both in the chip card and in the processing station.

The special advantage of the invention is that secret data need not be transmitted between processing station and chip card in plaintext at any time during initialization or a subsequent personalizing step. This firstly increases the security of the initializing and personalizing step, and secondly simplifies initialization and personalization because the latter need no longer be performed in separate steps. The resulting reduction in necessary security effort also reduces expenditures in chip card production.

Further advantages of the present invention can be found in the dependent claims and the following description with reference to a FIGURE.

BRIEF DESCRIPTION OF THE DRAWINGS

The single FIGURE shows a processing station and a chip card during initialization or personalization of the chip card.

DETAILED DESCRIPTION OF THE PREFERRED EMBODIMENTS

The FIGURE shows processing station S, chip card CC and data base DB. Processing station S contains terminal T effecting data exchange with chip card CC, and security module HSM serving to process secret data. These secret data can come for example from data base DB. The FIGURE also shows initializing step IS and personalizing step PS.

When new chip card CC is brought in connection with terminal T of processing station S for initialization, the authenticity of chip card CC can first be checked. This is necessary in order to prevent unauthorized chip cards from being initialized and thus obtaining secret data. To check the authenticity of chip card CC one can check for example whether the integrated circuit present on the chip card can be assigned to a certain manufacturer. Additionally one can check a serial number generated during production of the integrated circuit. For this purpose the serial number of the integrated circuit located on chip card CC is read out via terminal T. The thus determined serial number of the integrated circuit of chip card CC is then checked for permissibility in security module HSM. For this purpose a list of serial numbers stored in data base DB is checked.

After the authenticity check, values serving to determine a secret initial value are generated in security module HSM, the secret initial value being identical in security module HSM and chip card CC without the secret initial value being transmitted in plaintext from security module HSM via terminal T to chip card CC. Parts of the values generated in security module HSM are transmitted via terminal T to chip card CC. In chip card CC further values for determining the secret initial value are generated, parts of which are in turn transmitted to processing station S via terminal T. The secret initial value is subsequently determined in the processing station, i.e. in security module HSM, from the values generated in security module HSM and the values transmitted from the chip card. In chip card CC the secret initial value is determined by means of the values generated in the chip card and the values transmitted from the processing station.

The secret initial value can be for example a start value for generating random numbers. The secret initial value can also be used as a secret key for encrypting and decrypting data.

If the secret initial value is used as a key, personalizing data containing further secret keys, among other things, can for example be transmitted to chip card CC in a following processing step.

The secret initial value can be generated from the values generated in security module HSM and in chip card CC for example by means of algorithms or functions. It is especially advantageous if the same function is used for generating the secret initial value both in security module HSM and in chip card CC. For this purpose the FIGURE provides a function for initializing step IS which involves exponentiating a first variable or a first value with a second value and forming a modulo residue to a third value. In security module HSM the values g, n and x are generated. Value n is a large prime number, value g a primitive number, i.e. all numbers 1 ... n−1 can be represented in the form $g^i$ mod n. To increase security one should ensure that the value (n−1)/2 is likewise a prime number. Value x also generated in security module HSM is a random number, for which x<n holds. By means of the function $$X = g^x \bmod n \qquad (1)$$

values g, n and X are processed. Subsequently values g, n and X are transmitted via terminal T to chip card CC. Value x is kept secret in the security module. Value Y is generated in the chip card by means of a further function $$Y = g^y \bmod n. \qquad (2)$$

For this purpose one uses values g and n transmitted from the processing station and value y generated in the chip card. For value y it holds that y<n. Value y is a random number which is generated in particular in accordance with an individual identifier of chip card CC, e.g. a serial number. Value y is kept secret in chip card CC, whereas value Y is transmitted to processing station S. In processing station S the secret initial value, which is used as a key, is generated in security module HSM by means of a function $$K = Y^x \bmod n. \qquad (3)$$

The same secret initial value K is generated in chip card CC $$K = X^y \bmod n. \qquad (4)$$

The identity of secret initial value K in chip card CC and security module HSM is ensured since due to the exchange of the values between chip card CC and security module HSM it holds for K that:

$$K = g^{xy} \bmod n. \qquad (5)$$

By means of secret key K now present both in security module HSM and in chip card CC the safe transmission of secret personalizing data can be performed in following personalizing step PS. For this purpose personalizing data $PD_{KM}$ encrypted with major key KM are transmitted from data base DB to security module HSM. Major key KM is present in security module HSM and is used for decoding personalizing data $PD_{KM}$. Personalizing data PD now present in plaintext are encrypted again in a further step. Secret key K is used for this purpose. Thus generated encrypted personalizing data $PD_K$ are transmitted via terminal T to chip card CC where they are decoded with secret key K likewise present.

At the end of personalizing step PS secret key K can be deleted both in the chip card and in security module HSM since for further communication between processing station S and chip card CC one can use for example the secret keys contained in personalizing data PD.

Initializing and personalizing steps of the above-described kind can be used not only in the production of chip cards as mentioned at the outset, but also for later extension of chip cards, for example to extend a chip card subsequently by further applications. A chip card hitherto configured only as a credit card can be extended e.g. by an access control application.

The invention claimed is:

1. A method of initializing a chip card, comprising the steps of:
    inserting a chip card into a processing station, and
    initializing the chip card by having the processing station and the chip card each determine an secret initial value based on an exchange of parts of first and second values generated, respectively, in the processing station and the chip card, wherein
    first values for determining the secret initial value are generated in the processing station,
    parts of the first values are transmitted to the chip card,
    second values for determining the secret initial value are generated in the chip card,
    parts of the second values are transmitted to the processing station,
    the secret initial value is determined in the processing station from at least parts of the first values and the transmitted parts of the second values, and
    the secret initial value is determined in the chip card from at least parts of the second values and the transmitted parts of the first values.

2. A method according to claim 1, characterized in that at least one part of the second values generated in the chip card is generated in accordance with a serial number present in the chip card.

3. A method according to claim 1, characterized in that
    the first values generated in the processing station are subjected to a first function,
    the result of the first function is transmitted to the chip card in addition to a part of the first values generated, at least one part of the second values generated in the chip card is subjected to a second function with the transmitted part of the first values, the secret initial value is generated in the processing station by means of a third function from the transmitted result of the second function and a first part of the values not transmitted to the chip card, and the secret initial value is generated in the chip card by means of a fourth function from the transmitted result of the first function, the transmitted part of the first values and a part of the second values not transmitted to the processing station.

4. A method according to claim 3, characterized in that the first, second, third and fourth functions are identical.

5. A method according to claim 4, characterized in that the function involves exponentiating a first variable with a second variable and forming a modulo residue to a third variable, the variables corresponding to the first and second values and the first and second results.

6. A method according to claim 1, characterized in that the secret initial value is a start value for generating random numbers.

7. A method according to claim 1, characterized in that the secret initial value is a key for encrypting and decrypting data.

8. A method according to claim 7, characterized in that the key generated in the processing station and the chip card is used in a personalizing step for encrypting and decrypting further secret keys, which are transmitted from the processing station to the chip card.

9. A method according to claim 8, characterized in that the key generated in the processing station and the chip card is deleted in the processing station and the chip card after the personalizing step.

* * * * *